(12) United States Patent
Petrescu et al.

(10) Patent No.: US 8,130,841 B2
(45) Date of Patent: Mar. 6, 2012

(54) METHOD AND APPARATUS FOR COMPRESSION OF A VIDEO SIGNAL

(75) Inventors: Mihai G. Petrescu, North Hollywood, CA (US); Todd S. Roth, Shadow Hills, CA (US)

(73) Assignee: Harris Corporation, Melbourne, FL (US)

( * ) Notice: Subject to any disclaimer, the term of this patent is extended or adjusted under 35 U.S.C. 154(b) by 1801 days.

(21) Appl. No.: 11/319,370

(22) Filed: Dec. 29, 2005

(65) Prior Publication Data

US 2007/0153906 A1  Jul. 5, 2007

(51) Int. Cl.
  *H04N 7/12* (2006.01)
  *H04N 11/02* (2006.01)
  *H04N 11/04* (2006.01)
(52) U.S. Cl. ............... 375/240.24; 375/240.26
(58) Field of Classification Search ........... 375/240, 375/240.2, 240.12, 240.16, 240.23, 240.24, 375/240.25, 240.26; 386/95, 96, 98, 239; 370/394; 710/68; 709/231; 713/400; 718/100; 719/312; 381/81; 380/259; 711/118, 111; 725/39, 34; 382/243
See application file for complete search history.

(56) References Cited

U.S. PATENT DOCUMENTS

| | | | | |
|---|---|---|---|---|
| 5,610,657 A * | 3/1997 | Zhang | ...................... | 375/240.16 |
| 5,771,334 A * | 6/1998 | Yamauchi et al. | ............ | 386/239 |
| 5,812,195 A * | 9/1998 | Zhang | ...................... | 375/240.16 |
| 5,815,206 A * | 9/1998 | Malladi et al. | ........... | 375/240.26 |
| 6,377,628 B1 * | 4/2002 | Schultz et al. | ........... | 375/240.26 |
| 6,496,537 B1 * | 12/2002 | Kranawetter et al. | ..... | 375/240.24 |
| 6,507,618 B1 * | 1/2003 | Wee et al. | ................ | 375/240.16 |
| 6,553,150 B1 * | 4/2003 | Wee et al. | ...................... | 382/243 |
| 6,570,926 B1 * | 5/2003 | Agrawal et al. | .......... | 375/240.26 |
| 6,594,315 B1 * | 7/2003 | Schultz et al. | ........... | 375/240.25 |
| 6,735,253 B1 * | 5/2004 | Chang et al. | ............. | 375/240.16 |
| 6,879,631 B1 * | 4/2005 | Schultz et al. | ........... | 375/240.23 |
| 6,970,504 B1 * | 11/2005 | Kranawetter et al. | ......... | 375/240 |
| 7,675,972 B1 * | 3/2010 | Laksono et al. | ......... | 375/240.12 |
| 2001/0008577 A1 * | 7/2001 | Yamada et al. | ................. | 386/98 |
| 2001/0009566 A1 * | 7/2001 | Mihara | ..................... | 375/240.02 |
| 2001/0013123 A1 * | 8/2001 | Freeman et al. | ................ | 725/34 |
| 2002/0003948 A1 * | 1/2002 | Himeno et al. | ................. | 386/98 |
| 2002/0044609 A1 * | 4/2002 | Ueda | ....................... | 375/240.26 |
| 2002/0136219 A1 * | 9/2002 | Ding et al. | ..................... | 370/394 |
| 2003/0108105 A1 * | 6/2003 | Morad et al. | ............. | 375/240.26 |
| 2004/0073746 A1 * | 4/2004 | Fallon | .......................... | 711/111 |
| 2004/0161032 A1 * | 8/2004 | Morad et al. | ............. | 375/240.12 |
| 2004/0213548 A1 * | 10/2004 | Himeno et al. | ................. | 386/95 |
| 2004/0213549 A1 * | 10/2004 | Himeno et al. | ................. | 386/95 |
| 2004/0223746 A1 * | 11/2004 | Himeno et al. | ................. | 386/96 |

(Continued)

OTHER PUBLICATIONS

European Search Report.

(Continued)

*Primary Examiner* — Twyler Haskins
*Assistant Examiner* — Nicholas Pachol
(74) *Attorney, Agent, or Firm* — Duane Morris, LLP

(57) ABSTRACT

Single instances of individual codecs are instantiated on different processing elements, and blocks of video frames are interspersed or 'striped' across the multiple instances. An apparatus according to the invention comprises a demultiplexer for receiving the incoming uncompressed video stream and parsing it into blocks, each containing an integer multiple of the inter-frame coding distance, and each block is alternately sent to a different processing element for compression. This allows the output compressed signal to be generated in real-time without dropping frames.

23 Claims, 6 Drawing Sheets

U.S. PATENT DOCUMENTS

| | | | |
|---|---|---|---|
| 2004/0243745 A1* | 12/2004 | Bolt et al. | 710/68 |
| 2005/0015372 A1* | 1/2005 | Van Eijndhoven et al. | 707/9 |
| 2005/0015637 A1* | 1/2005 | Van Eijndhoven et al. | 713/400 |
| 2005/0021807 A1* | 1/2005 | Van Eijndhoven et al. | 709/231 |
| 2005/0081200 A1* | 4/2005 | Rutten et al. | 718/100 |
| 2005/0158016 A1* | 7/2005 | Himeno et al. | 386/4 |
| 2005/0163474 A1* | 7/2005 | Himeno et al. | 386/98 |
| 2005/0180580 A1* | 8/2005 | Murabayashi et al. | 381/81 |
| 2005/0183091 A1* | 8/2005 | Van Eijndhoven et al. | 719/312 |
| 2006/0193470 A1* | 8/2006 | Williams | 380/259 |
| 2006/0290776 A1* | 12/2006 | Rutten et al. | 375/240.2 |
| 2007/0050515 A1* | 3/2007 | Fallon | 709/231 |
| 2007/0168615 A1* | 7/2007 | Van Eijndhoven et al. | 711/118 |
| 2008/0028426 A1* | 1/2008 | Goto et al. | 725/39 |
| 2008/0212681 A1* | 9/2008 | Yavits et al. | 375/240.16 |

OTHER PUBLICATIONS

Ahmad, I et al.; "A Scalable Off-Line MPEG-2 Video Encoding Scheme Using a Multiprocessor System"; Elseiver Publishers, Amsterdam; vol. 27; No. 6; May 1, 2001; pp. 823-846.

Ahmad I, et al; "Video Compression with Parallel Processing"; Elseiver Publishers; Amsterdam; vol. 28; Nos. 7-8; Aug. 1, 2002; pp. 1039-1078.

* cited by examiner

METHOD AND APPARATUS FOR COMPRESSION OF A VIDEO SIGNAL

FIELD OF THE INVENTION

This invention relates to signal processing. In particular, this invention relates to a method and apparatus for compressing a video signal.

BACKGROUND OF THE INVENTION

Video compressor/decompressors, known as "codecs," are used for the compression of video signals, in order to reduce the bandwidth required for transmission. Video codecs must compress extremely large volumes of data in very short time intervals, for example for streaming over a computer network such as the Internet, for broadcast by a satellite or cable broadcast system, or for playback by a digital video disk player.

Video signals are most often compressed according to the MPEG (Motion Picture Experts Group) compression standard. An MPEG bit stream consists of three components: system, video and audio. The system component relates information about the bit stream and its format, while the video and audio components are compressed versions of a real-time stream of audio and video data. Because high quality video is so data intensive, most of the available bandwidth is occupied by the video data.

According to MPEG standards, the video stream is generated as a series of frames at a constant bit rate, the frames being categorized as either I (intraframe), P (predicted) or B (bi-directional) frame. A group of pictures (GOP) starts with an I frame, which contains all the data necessary to describe the image represented by the frame, and within the GOP is followed by a predicted frame which contains data representing the difference between itself and the previous I or P frame. Two B frames, which contain data defining the difference between the previous frame and the following frame, are interposed between I and P frames and between P frames. A compressed MPEG stream therefore consists of an I frame and at least one P frame, each P frame being separated from the previous I frame or P frame by a pair of B frames.

MPEG supports different frame rates, the most common being 29.97, 30, 59.94, or 60 frames per second. Even at the slowest of these frame rates, on average each frame must be compressed within about 33 ms in order to generate a compressed video signal in real-time. Compression of a video signal into MPEG format in real-time thus requires a very high processing speed for large image sizes such as high definition (HD). Since current processors are incapable of achieving this level of performance, conventional codecs can only generate a compressed video stream in real-time by dropping frames from the GOP, as shown in FIG. 1. In addition to requiring complicated algorithms to minimize the loss of image information as frames are dropped, this inevitably reduces the picture quality produced by the uncompressed signal input to the video display device.

Software-based codec performance is largely dependent upon the speed of the processor, and as such advances in processing performance were initially based upon increasing the processor clock rate. More recently, attempts to increase the processing rate have been directed to using multiple host processors, whether as separate chips or multiple CPU cores in a single chip. However, as multiple processors are introduced codec performance scalability must be designed for multiple thread, non-uniform memory access (NUMA) in order to make effective use of the multiple processing cores. Distribution of the processing load to the additional processors cannot be effectively controlled, so the internal threads do not necessarily balance the processing load across all available CPUs, and since codec architectures are complex and not readily restructured, redesigning the codec in order to efficiently distribute the processing load amongst different processing cores is not practical. As such, providing multiprocessing capability to a conventional codec is not an efficient solution to the need for increased processing capacity, because the additional processing resources are used only minimally and therefore relatively little performance advantage over a conventional CPU implementation is realized. Frames must still be dropped from the compressed output signal, with attendant loss of image quality.

It would accordingly be advantageous to provide a method and apparatus for the compression of video in real-time using multiple processors, which balances the processing load amongst available resources without having to redesign the codec architecture to accommodate multiprocessing.

The present invention provides a method of compressing a video signal comprising a stream of data representing a series of image frames in chronological order, comprising the steps of: a. parsing the video signal into blocks, each block comprising a preselected number of frames, b. time stamping each block, c. distributing successive blocks to different processing elements for compression, d. compressing the blocks, e. storing each compressed block to allow sufficient time for the compression and storage of at least one immediately succeeding block, and f. assembling the compressed blocks in chronological order in a compressed video stream.

The present invention further provides a computer program product for use with a computer, the computer program product comprising a computer usable medium having computer readable program code means embodied in said medium for compressing a video signal comprising a stream of data representing a series of image frames in chronological order, said computer program product having computer readable program code means for parsing the video signal into blocks, each block comprising a preselected number of frames, computer readable program code means for time stamping each block, computer readable program code means for distributing successive blocks to different processing elements for compression, computer readable program code means for compressing the blocks, computer readable program code means for storing each compressed block to allow sufficient time for the compression and storage of at least one immediately succeeding block, and computer readable program code means for assembling the compressed blocks in chronological order in a compressed video stream.

The present invention further provides an apparatus for compressing a video signal comprising a stream of data representing a series of image frames in chronological order, comprising a plurality of processing elements for compressing blocks of the video signal, each block comprising a preselected number of frames, a demultiplexer for parsing the video signal into the blocks, time stamping each block and distributing successive blocks to different processing elements of the plurality of processing elements for compression, a buffer associated with an output of each processing element, for storing each compressed block, and a multiplexer for assembling the compressed blocks in chronological order in a compressed video stream, whereby each block is stored in the buffer for a sufficient interval to allow time for the compression and storage of at least one immediately succeeding block.

DESCRIPTION OF THE DRAWINGS

In drawings which illustrate by way of example only a preferred embodiment of the invention.

DETAILED DESCRIPTION OF THE INVENTION

Figure 1:
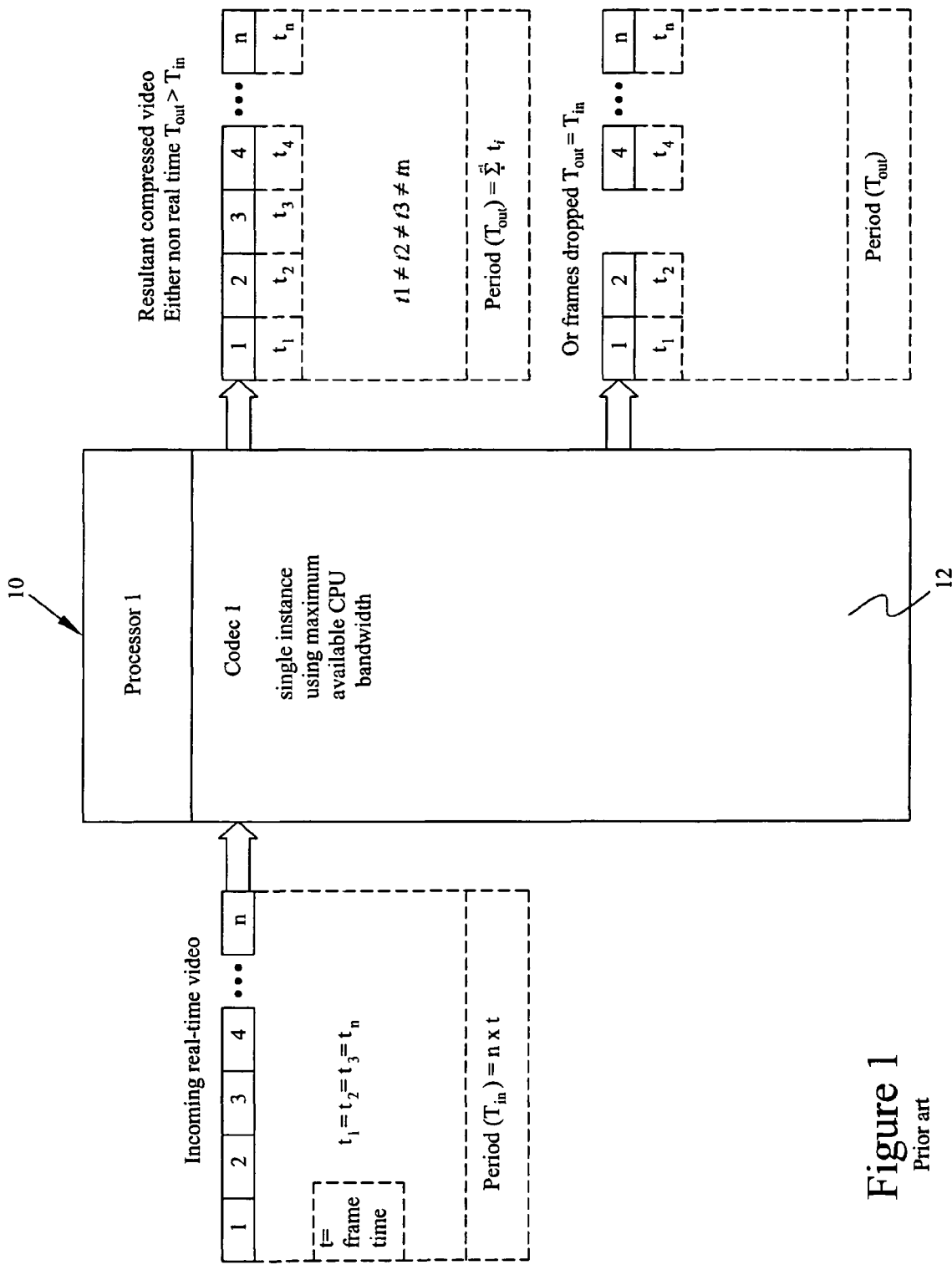
FIG. 1 is a schematic diagram of a prior art MPEG video codec, illustrating alternatives for the compressed video signal outputs.

FIG. 1 illustrates a prior art MPEG processor 10 comprising a codec 12, which processes an incoming uncompressed video stream to produce either a non-real-time compressed video output that retains the data integrity of the input signal, or a real-time compressed video output from which frames of the input video stream have been dropped in order to reduce the compression time for each GOP. The processing performance of the codec 12 is limited by the speed of the single codec instance, even though 100 percent of the available CPU bandwidth is being used. Thus, if the codec takes 12 frame intervals $t_f$ to process 10 incoming frames of video, two of the incoming frames must be dropped in order to maintain real-time performance of the output video stream.

Figure 2:
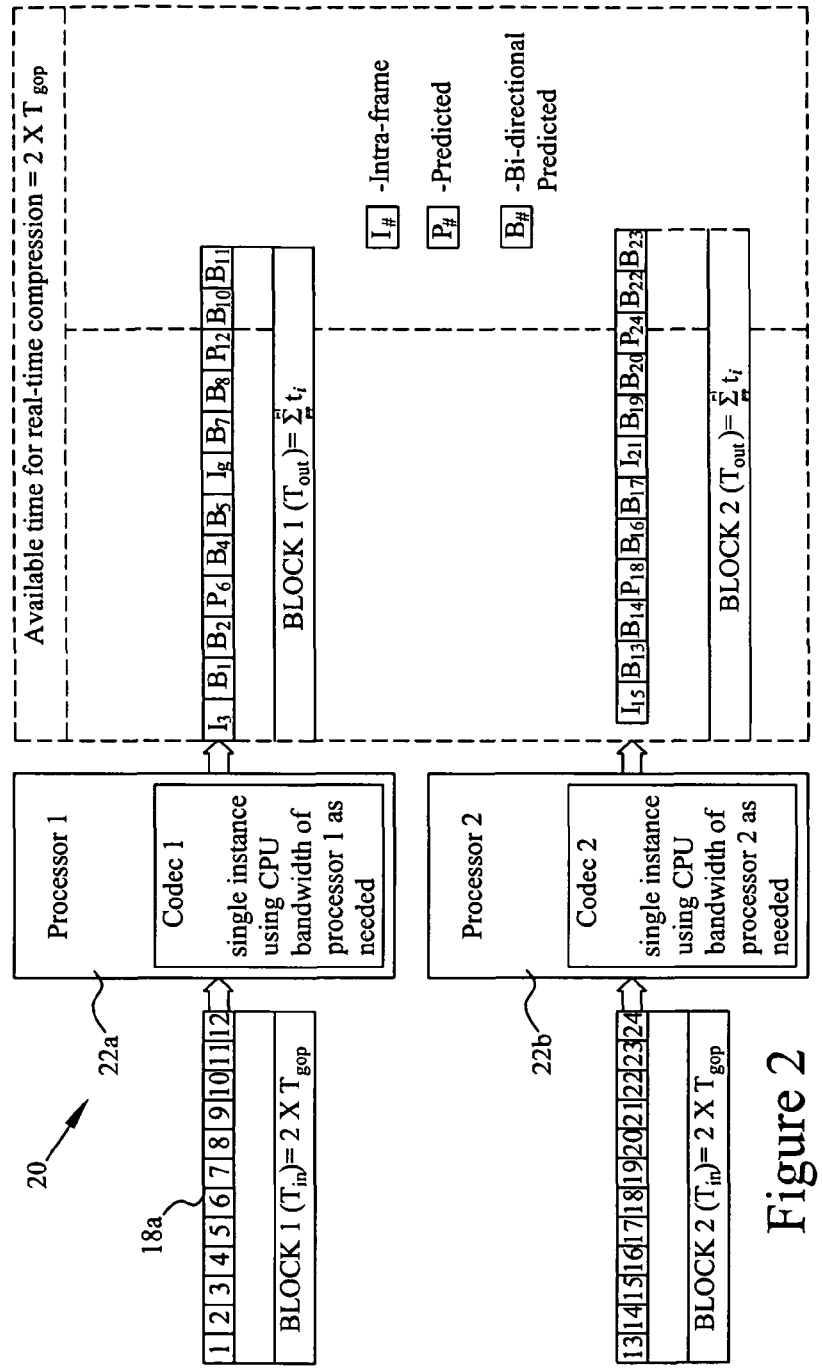
FIG. 2 is a schematic diagram of an MPEG video codec processing element array according to a preferred embodiment of the invention, illustrating the distribution of processing load between two processing elements.

FIG. 2 illustrates a codec processing element array 20 according to an embodiment of the invention. The method and apparatus of the invention takes advantage of multi-processing by instantiating single instances of individual codecs on each different processing element 22, and interspersing or 'striping' blocks of video frames across the multiple instances.

Figure 3:
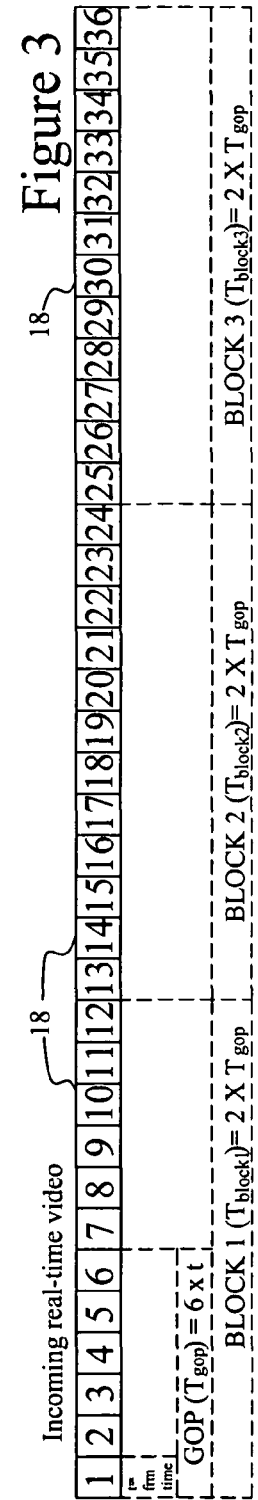
FIG. 3 is a schematic diagram of a video signal showing the parsing of frames into blocks for the codec processor of FIG. 2.

As shown in FIG. 2, the codec processing element array 20 comprises a pair of processing elements 22, including a first processing element 22a programmed with a single codec instance for compressing an incoming video signal in MPEG format and a second processing element 22b similarly programmed with a single codec instance for processing alternate blocks 18 of the video input signal, for example as shown in FIG. 3. The processing elements 22 may be disposed in separate processor chips or may be separate processing cores on the same chip.

The video input signal is thus parsed into input blocks $18_1$ . . . $18_n$, for example as illustrated in FIG. 3, each block 18 containing an integer multiple of the inter-frame coding distance, which in the case of MPEG video is the GOP. In the example of FIG. 3 each block 18 contains two GOPs, each GOP in turn containing six frames.

Figure 4:
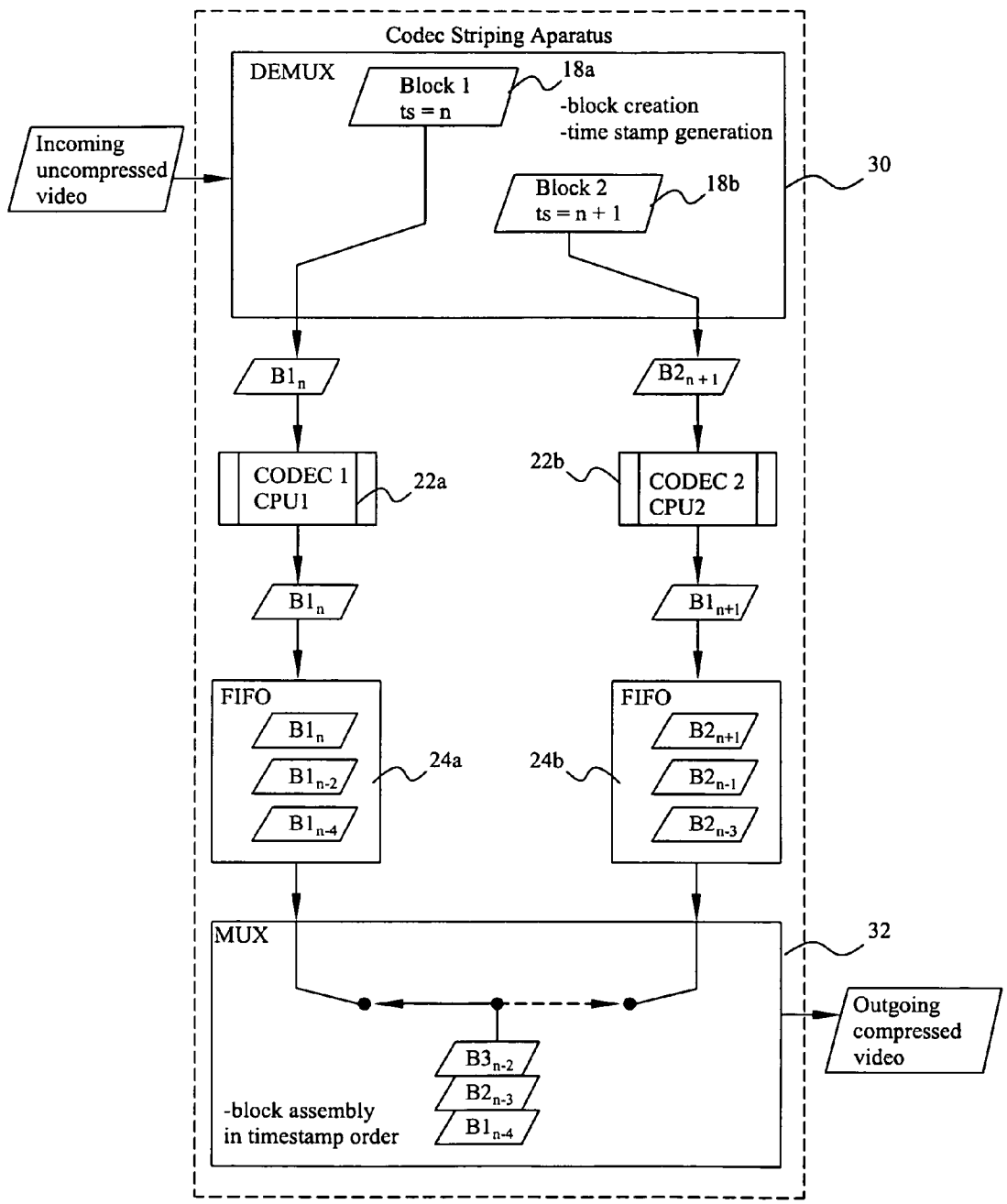
FIG. 4 is a block diagram of a video compression apparatus embodying the codec processor of FIG. 2.

An apparatus according to the invention, illustrated in FIG. 4, comprises a demultiplexer 30 which receives the incoming uncompressed video stream and parses it into blocks 18 having the preselected number of GOPs. In the illustrated embodiment, each block 18, for example consisting of two GOPs as shown in FIG. 3, is alternately sent to a different processing element 22a or 22b for compression. Thus, in the example illustrated in FIGS. 2 and 4 the first block 18a containing two GOPs consisting of frames 1 to 12 of the input video signal is sent (in real-time) to the first processing element 22a, while the second block 18b containing two GOPs consisting of frames 13 to 24 of the input video signal is sent (in real-time) to the second processing element 22b. Each processing element 22 thus effectively has 24 frame intervals $t_f$ to complete the compression of 12 frames, which allows the output compressed signal to be generated in real-time (defined herein as approximately 33 milliseconds or less per frame at the standard frame rate of 30 frames per second). Although there is necessarily a delay inherent in the codec processing time, the compression frame rate and the input frame rate are isosynchronous so that the net result, averaged over many blocks 18 of video, is in real-time.

The demultiplexer 30, which may for example be a memory media buffer with corresponding frame boundary pointers comprising an algorithm for detecting the frame boundary at the end of each GOP, parses the input video signal into blocks 18 based on the frame rate and the preselected number of frames per block (e.g. 12 frames, or 2 GOPs, in the example illustrated in FIG. 3). After the preselected number of frames of input video has been sent by the demultiplexer 30 to one of the processing elements 22a or 22b, the demultiplexer 30 switches to the alternate processing element 22a or 22b to transmit the next block 18. As the demultiplexer 30 sends each block 18 of video to a processing element 22a or 22b it time stamps the block 18, which as described below facilitates assembly of the compressed blocks 18 into a compressed video stream.

The processing elements 22 may for example be the two processing cores of a dual-core AMD Opteron 280 processor running at 2.4 GHz. The codec within each processing element 22a, 22b, which may be a conventional MPEG codec, compresses the block of video 28 into MPEG format and outputs the compressed block of video 28 to a respective FIFO buffer 24a, 24b. Each FIFO buffer 24 stores a predetermined number of blocks 18, for example three as in the embodiment shown, to ensure that the processing element 22 receiving the next succeeding block 18 has time to compress the entire block 18 before the compressed output signal is assembled. Although the blocks 18 of frames are received in real time, because the compressed blocks 18 are output to FIFO buffers 24 and each codec thus has 24 frame intervals $t_f$ to complete the compression of twelve frames, the blocks 18 of frames can be considered as having been processed by the processing elements 22a, 22b simultaneously.

Each FIFO buffer 24 thus outputs the stored blocks 18 in chronological sequence to a multiplexer 32, which assembles the blocks 18 received from the FIFO buffers 24a, 24b to create the outgoing compressed video signal. The blocks 18 output from each individual FIFO buffer 24 are necessarily in chronological order, and the multiplexer 32 reads the time stamp on each block in order to assemble the blocks 18 output by the different FIFO buffers 24 into a compressed video stream according to the time stamp that was applied by the demultiplexer 30. The compressed frame blocks can then be transmitted to a display device for real-time applications, or written to a memory or storage media.

Figure 5:
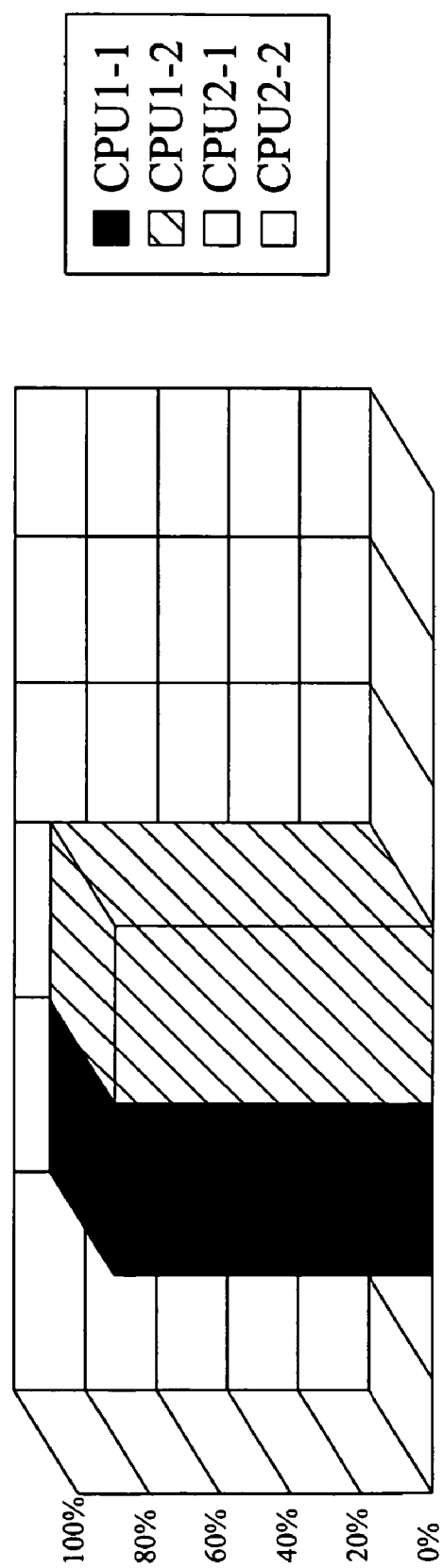
FIG. 5 is a graph showing the distribution of processing load in the compression apparatus of FIG. 4.

FIG. 5, which illustrates the CPU usage in the apparatus of FIG. 4, shows that by evenly distributing the processing load between the processing elements 22 in this fashion, the processing capacity is used most efficiently.

Figure 6:
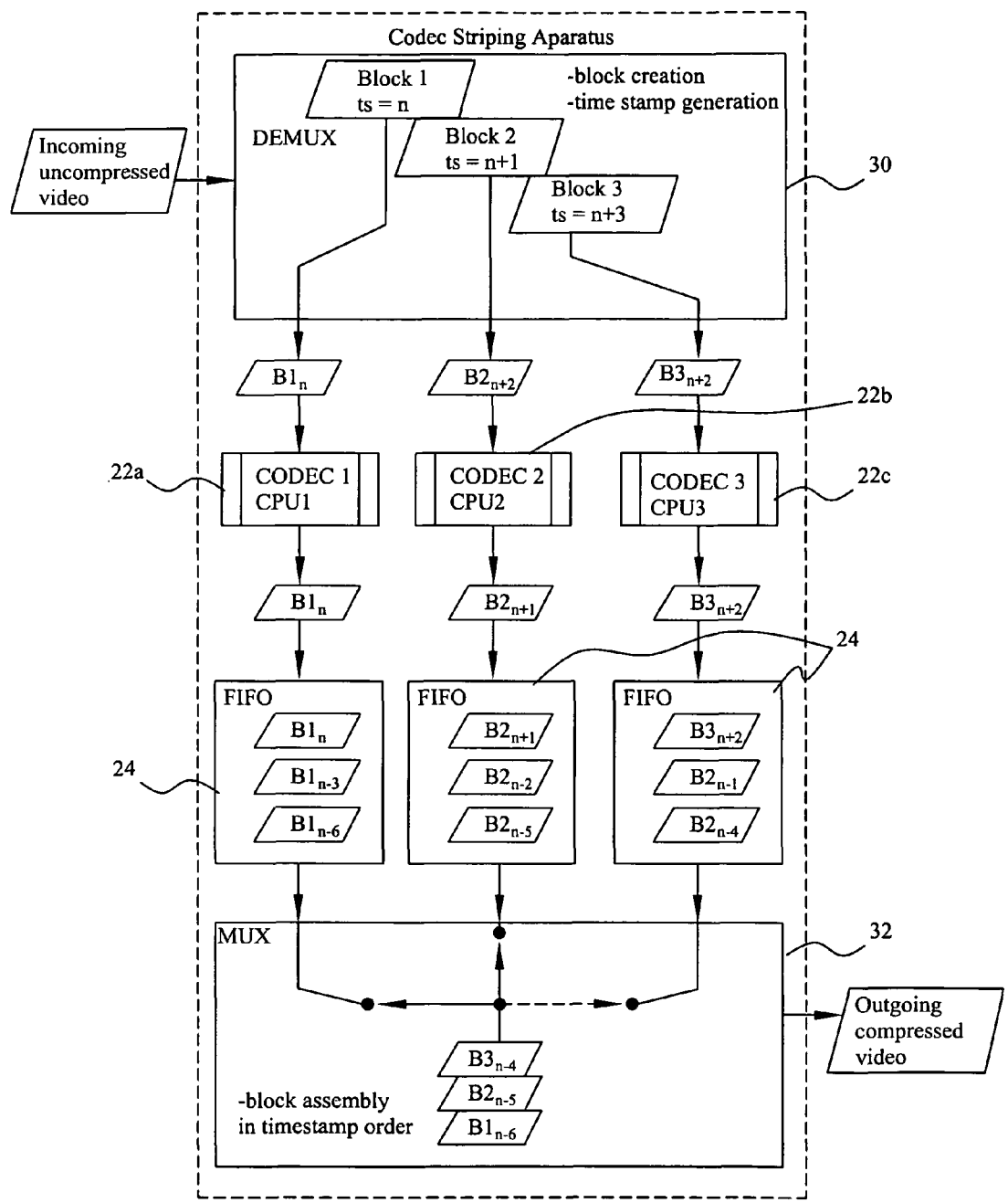
FIG. 6 is a block diagram of a video compression apparatus according to a further preferred embodiment of the invention comprising three processing elements.

FIG. 6 illustrates an apparatus according to the invention comprising three processing elements 22. Using the example of preselecting 12 frames or two GOPs for each video block 18, in this apparatus frames 1 to 12 of the incoming video signal are processed by codec 1 in processing element 22a, frames 13 to 24 are processed by codec 2 in processing element 22b, and frames 25 to 36 are processed by codec 3 in processing element 22c. In this apparatus, each codec thus has 36 frame intervals $t_f$ to complete the compression of 12 frames. The operation of this embodiment is otherwise as described in connection with the embodiment of FIG. 4. It can be seen that regardless of the number of processing elements 22, balanced compute-load processing can be achieved across all available processors, allowing the scalability of multi-processor multi-core technology to effect real-time video compression.

An apparatus as shown in FIGS. 4 or 6 is particularly suitable for performing MPEG 2 compression on high definition video (1080i). A dual-core AMD Opteron 280 processor running at 2.4 GHz can also be used in the apparatus of FIG. 6, but it has been found that three processing elements 22 are sufficient to facilitate real-time compression so in this case one of the processing cores is superfluous. More processing-intensive compression algorithms, such as AVC (H.264) and VC1 (Windows Media 9) may require a greater number of codec instances, in which case quad dual-core Opteron processors can be employed, allowing block 'striping' across up to eight CPU/codec pairs.

For lower data rate compression including 4:2:0 profile MPEG 2, two processing elements 22 can perform real-time compression with a peak utilization of 90% of processing capacity. For higher data rates including 4:2:2 profile MPEG 2, three processing elements 22 can perform real-time compression with a peak utilization of 80% of processing capacity (which, if two dual-core processors are used, represents only 60% of the aggregate platform resources).

It will be appreciated that the codec instances can be resident in separate processors, or in separate processing cores on the same chip, or any combination thereof, without affecting the operation of the invention, and both embodiments are equally contemplated by the present invention. The capacity of each processing element 22 can be tasked equally, because the demultiplexer 30 assigns the blocks 18 of video signal to the different processing elements 22 in alternating or 'striping' sequence and thus ensures a balanced use of processing resources. Parsing the video signal into blocks 18 of equal length is advantageous because it simplifies the operation of the apparatus, however it will be appreciated that the blocks 18 do not necessarily have to be of equal length and variations in the number of GOPs per block 18, although requiring more complex algorithms, will also work as long as each block 18 contains an integer number of GOPs.

Figure 7:
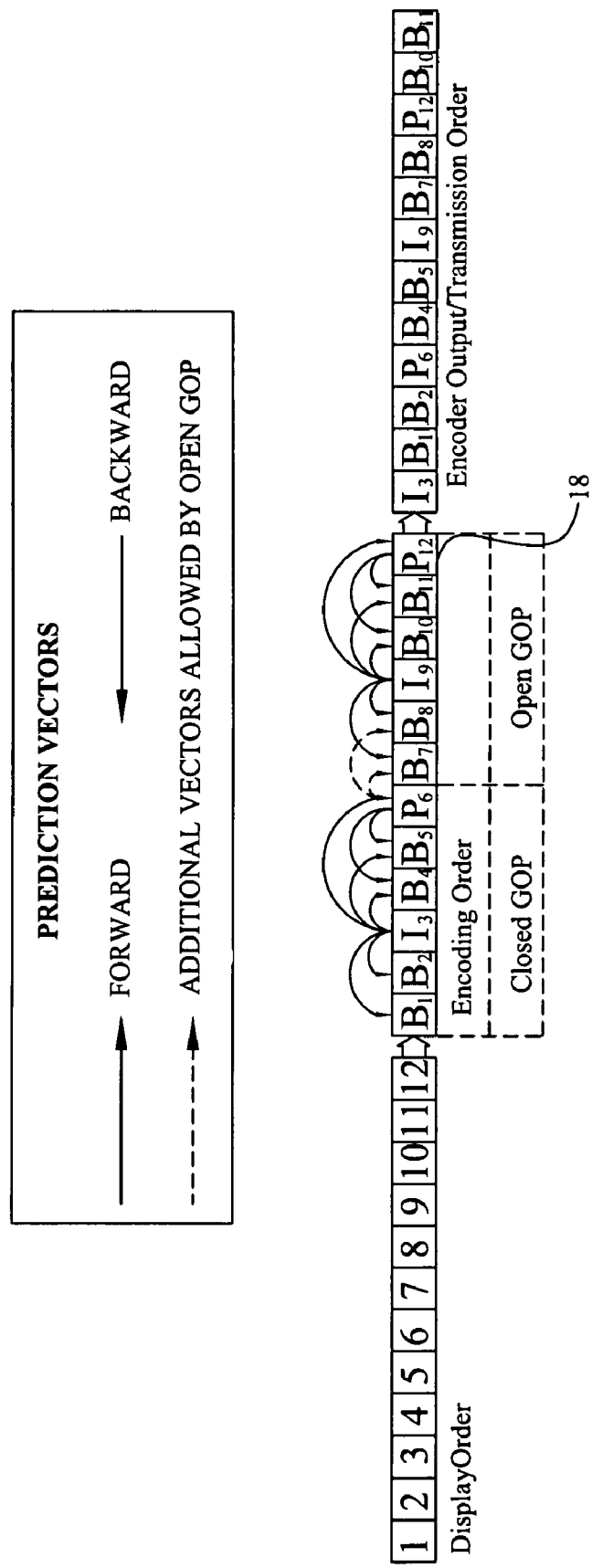
FIG. 7 is a schematic diagram of the video signal of FIG. 3, showing the availability of additional coding vectors arising from the provision of open GOPs within each block.

The invention provides the further advantage that, since each video block 16 contains two GOPs, each video block 18 contains two P frames that can be referenced for image prediction. Whereas in a conventional processor which processes one GOP at a time, and thus has only the data within that individual GOP (which may include a single P frame) from which to make predictions, according to the present invention each processing element 22 processes more than one GOP at a time and therefore can have multiple frames to reference for prediction. For example, FIG. 7 illustrates coding vectors that show logic for choosing multiple GOPs. Each block of 12 frames contains two I frames and two P frames, thus providing additional vectors for frame prediction. In other words, by providing multiple GOPs per block 18, coding inefficiencies resulting from strict closed-loop GOP encoding can be avoided by closing only the first GOP in the block and allowing the remaining GOP(s) to remain open, i.e. addressable by vectors based on a previous GOP. This provides greater prediction accuracy than prior art codecs or, alternatively, equal prediction accuracy from a lower bandwidth signal.

The invention can be implemented with any integer number of GOPs per block 18, however there is diminishing return because as more GOPs are added the FIFO buffers 24 start to become too large to manage efficiently. Two GOPs per block 18 provides significantly better compression performance, and three GOPs per block 18 may in some cases provide still higher processing efficiency.

Additionally, any number of processing elements 22 may be provided in accordance with the invention, however at current compression rates three processing elements 22 (either three separate processors or two separate processors at least one of which has two processing cores) provide sufficient combined processing capacity to allow for the complete processing of all frames of the incoming video signal.

Various embodiments of the present invention having been thus described in detail by way of example, it will be apparent to those skilled in the art that variations and modifications may be made without departing from the invention. The invention includes all such variations and modifications as fall within the scope of the appended claims.

We claim:
1. A method of compressing a video signal comprising a stream of data representing a series of image frames in chronological order, comprising the steps of:
   a. parsing the video signal into blocks, each block comprising a preselected number of frames,
   b. time stamping each block,
   c. distributing successive blocks to different processing elements for compression,
   d. compressing the block,
   e. storing each compressed block to allow sufficient time for the compression and storage of at least one immediately succeeding block, and
   f. assembling the compressed blocks in chronological order in a compressed video stream.

2. The method of claim 1 wherein the blocks each comprise the same number of frames.

3. The method of claim 2 wherein the video signal is compressed in MPEG format wherein groups of frames are each contained within a Group Of Pictures (GOP), and wherein each block comprises an integer number of GOP's wherein each GOP has its own GOP header.

4. The method of claim 3 wherein each block comprises two GOP's.

5. The method of claim 3 wherein each block the first GOP is a closed GOP addressable only by vectors based on frames within the first GOP, and at least one other GOP is an open GOP addressable by vectors based on any previous GOP in the block.

6. The method of claim 1 wherein in step c. successive blocks are distributed to two different processing elements for compression.

7. The method of claim 1 wherein in step c. successive block are distributed to three different processing elements for compression.

8. The method of claim 1 wherein in step e. the block are stored in a FIFO buffer associated with each respective processing elements.

9. A computer program product for use with a computer, the computer program product comprising a computer usable non-transitory medium having computer readable program code means embodied in said medium for compressing a video signal comprising a stream of data representing a series of image frames in chronological order, said computer program product having computer readable program code means for parsing the video signal into blocks, each block comprising a preselected number of frames, computer readable program code means for time stamping each block, computer readable program code means for distributing successive blocks to different processing elements for compression, computer readable program code means for compressing the blocks, computer readable program code means for storing each compressed block to allow sufficient time for the compression and storage of at least one immediately succeeding block, and computer readable program code means for assembling the compressed blocks in chronological order in a compressed video stream.

10. The computer program product of claim 9 wherein the blocks each comprise the same number of frames.

11. The computer program product of claim 10 wherein the video signal is compressed in MPEG format wherein groups of frames are each contained within a GOP, and wherein each block comprises an integer number of GOPs wherein each GOP has its own GOP header.

12. The computer program product of claim 11 wherein each block comprises two GOPs.

13. The computer program product of claim 11 wherein in each block the first GOP is a closed GOP addressable only by vectors based on frames within the first GOP, and at least on other GOP is an open GOP addressable by vectors based on any previous GOP in the block.

14. The computer program product of claim 1 wherein successive blocks are distributed to two different processing elements for compression.

15. The computer program product of claim 1 wherein successive blocks are distributed to three different processing elements for compression.

16. The computer program product of claim 1 wherein the blocks are stored in a FIFO buffer associated with each respective processing element.

17. An apparatus for compressing a video signal compressing a stream of data representing a series of image frames in chronological order, comprising a plurality of processing elements for compressing blocks of the video signal, each block comprising a preselected number of frames, a demultiplexer for parsing the video signal into the blocks, time stamping each block and distributing successive blocks to different processing elements of the plurality of processing elements for compression, a buffer associated with an output of each processing element, for storing each compressed block, and a multiplexer for assembling the compressed blocks in chronological order in a compressed video stream, whereby each block is stored in the buffer for a sufficient interval to allow time for the compression and storage of at least one immediately succeeding block.

18. The apparatus of claim 17 wherein the blocks each comprise the same number of frames.

19. The apparatus of claim 18 wherein the video signal is compressed in MPEG format wherein groups of frames are each contained within a Group of Pictures (GOP), and wherein each block comprises an integer number of GOPs wherein each GOP has its own GOP header.

20. The apparatus of claim 19 wherein in each block the first GOP is a closed GOP addressable only by vectors based on frames within the first GOP, and at least one other GOP is an open GOP addressable by vectors based on any previous GOP in the block.

21. The apparatus of claim 17 comprising two processing elements.

22. The apparatus of claim 17 comprising more than two processing elements.

23. The apparatus of claim 17 wherein the buffers comprise FIFO buffers.

\* \* \* \* \*